United States Patent
Pi et al.

(10) Patent No.: US 11,217,911 B2
(45) Date of Patent: Jan. 4, 2022

(54) WIRE JOINT AND MANUFACTURING METHOD THEREOF

(71) Applicant: ZOPOISE TECHNOLOGY (ZHUZHOU) CO., LTD., Zhuzhou (CN)

(72) Inventors: Bruce Pi, Zhuzhou (CN); Wei Kang, Zhuzhou (CN); Ren Zhong, Zhuzhou (CN)

(73) Assignee: ZOPOISE TECHNOLOGY (ZHUZHOU) CO., LTD., Zhuzhou (CN)

(*) Notice: Subject to any disclaimer, the term of this patent is extended or adjusted under 35 U.S.C. 154(b) by 87 days.

(21) Appl. No.: 16/516,216

(22) Filed: Jul. 18, 2019

(65) Prior Publication Data

US 2020/0303844 A1    Sep. 24, 2020

(30) Foreign Application Priority Data

Mar. 22, 2019    (CN) .......................... 201910222814.2

(51) Int. Cl.
*H01R 4/70*    (2006.01)
*F21V 23/00*    (2015.01)
(Continued)

(52) U.S. Cl.
CPC .............. *H01R 4/70* (2013.01); *F21V 23/001* (2013.01); *F21V 23/06* (2013.01); *H01R 4/58* (2013.01); *H01R 43/005* (2013.01); *H01R 43/28* (2013.01)

(58) Field of Classification Search
CPC . H01R 4/58; H01R 4/70; H01R 4/206; H01R 4/2466; H01R 4/5041; F21V 23/001; F21V 23/06
See application file for complete search history.

(56) References Cited

U.S. PATENT DOCUMENTS

| 4,032,214 A | 6/1977 | McNerney |
| 4,370,518 A * | 1/1983 | Guzy ................. H02G 15/1806 |
| | | 156/49 |

(Continued)

FOREIGN PATENT DOCUMENTS

| CA | 1 145 825 A | 5/1983 |
| CN | 207648745 U | 7/2018 |

(Continued)

OTHER PUBLICATIONS

European Search Report in Application No. 19185189.8 dated Jan. 22, 2020.

*Primary Examiner* — Paresh H Paghadal
(74) *Attorney, Agent, or Firm* — Maschoff Brennan

(57) ABSTRACT

Disclosed are a wire joint and a manufacturing method thereof. The wire joint includes a wire and a joint; the wire includes a plurality of strands of core wires and a first wire skin, each strand of the core wires is wrapped by the first wire skin, the first wire skin outside the each strand of the core wires is stripped within a threshold interval, the each strand of the core wires in the threshold interval is subjected to a tin-impregnation treatment, and an insulating wire fastener is provided between the each strand of the core wires in the threshold interval; the joint includes a connection section and an extraposition section, the insulating wire fastener is wrapped in the extraposition section, and the connection section is connected at one end of the extraposition section and wraps outside the first wire skin of the plurality of strands of core wires.

5 Claims, 7 Drawing Sheets

(51) Int. Cl.
*F21V 23/06* (2006.01)
*H01R 4/58* (2006.01)
*H01R 43/00* (2006.01)
*H01R 43/28* (2006.01)

(56) References Cited

U.S. PATENT DOCUMENTS

| | | | | |
|---|---|---|---|---|
| 4,599,487 | A * | 7/1986 | Blank | H02G 15/013 |
| | | | | 174/151 |
| 2013/0140078 | A1* | 6/2013 | Shih | H05K 5/0213 |
| | | | | 174/535 |
| 2018/0131168 | A1 | 5/2018 | Tanaka et al. | |
| 2019/0157776 | A1* | 5/2019 | Castillo | H01R 4/70 |

FOREIGN PATENT DOCUMENTS

| | | | |
|---|---|---|---|
| CN | 108493889 | A | 9/2018 |
| JP | 2005011717 | A | 1/2005 |

* cited by examiner

WIRE JOINT AND MANUFACTURING METHOD THEREOF

TECHNICAL FIELD

The present disclosure relates to the field of lamp technology, and in particular relates to a wire joint and a manufacturing method thereof.

BACKGROUND

With the development of LED technology, the LED lamp has been widely used in people's lives, and the LED lamp is often used outdoors.

Existing outdoor LED lamp is generally waterproofed on the lamp body. For example, a waterproof connector is provided on the lamp body for the power cable passing through to realize the electrical connection inside and outside the lamp. However, gaps are existed between a plurality of strands of core wires of the power cable, and between a plurality of core wires of each strand of core wires. These gaps directly communicate with the inside and outside of the lamp. After the lamp works for a long time, there is a temperature difference between the inside and the outside of the lamp body, that is, there is an atmospheric pressure difference between the inside and the outside of the lamp body. In this case, the siphon phenomenon may happen inside and outside the lamp. Water vapor or even liquid water may enter the inside of the lamp body along these gaps, and then atomization will be formed inside the lamp, which will make bad effect on the lighting effect of the lamp, and even bring potential safety hazard to the use of lamp.

SUMMARY

In view of this, the embodiment of the present disclosure provides a wire joint and a manufacturing method thereof for solving the technical problem that the siphon phenomenon may occur after the existing LED lamp working for a long time, which may make bad effect on the lighting effect and lighting safety.

The embodiment of the present disclosure provides a wire joint, including a wire and a joint;

where the wire includes a plurality of strands of core wires and a first wire skin, each strand of the core wires is respectively wrapped by the first wire skin, the first wire skin outside the each strand of the core wires is stripped within a threshold interval, the each strand of the core wires in the threshold interval is subjected to a tin-impregnation treatment, and an insulating wire fastener is provided between the each strand of the core wires in the threshold interval;

the joint includes a connection section and an extraposition section, the insulating wire fastener is wrapped in the extraposition section, and the connection section is connected at one end of the extraposition section and wraps around the outer circumference of the first wire skin of the plurality of strands of core wires.

Further, a cross-sectional dimension of the extraposition section is larger than a cross-sectional dimension of the connection section, a circumference of the connection section is provided with a thread, and a notch is formed on the thread along a length direction of the connection section;

a first breathing channel is provided in the extraposition section, one port of the first breathing channel is in communication with the notch, and the other port is located on a surface of the extraposition section, and a first breathing film is provided in the first breathing channel.

Further, a first pressing block is interference fitted in the port of the first breathing channel being located on the surface of the extraposition section for pressing the first breathing film, and at least one first through hole is formed on the first pressing block.

Further, a sealing ring is provided around an outer circumference of the thread on one end of the connection section close to the extraposition section.

Further, the cross-sectional dimension of the connection section increases gradually from one end away from the extraposition section to one end close to the extraposition section;

a second breathing channel is provided in the joint, one port of the second breathing channel is located at the end of the connection section away from the extraposition section, the other port is located on the surface of the extraposition section, and a second breathing film is provided in the second breathing channel.

Further, a second pressing block is interference fitted in the port of the second breathing channel being located on the surface of the extraposition section for pressing the second breathing film, and at least one second through hole is formed on the second pressing block.

Further, the wire includes a second wire skin, and the second wire skin wraps around the outer circumference of the first wire skin of the plurality of strands of core wires outside the threshold interval, and is wrapped by the joint.

Further, an interface is provided at the each strand of the core wires within the threshold interval, the outer circumference of each interface is wrapped by a copper terminal, and the outer circumference of each copper terminal is wrapped by the insulating wire fastener.

The embodiment of the present disclosure also provides a manufacturing method of a wire joint, including:

stripping a wire comprising a plurality of strands of core wires to expose a plurality of core wires of each strand of the core wires within a threshold interval;

performing a tin-impregnation treatment on the plurality of core wires of the each strand of the core wires within the threshold interval respectively;

inserting the wire after the tin-impregnation treatment into a first mold for a first injection molding process to form an insulating wire fastener between the each strand of the core wires within the threshold interval; and inserting the wire after the first injection molding into a second mold for a second injection molding process to form a joint comprising a connection section and an extraposition section, wherein the insulating wire fastener is wrapped in the extraposition section, and the connection section is connected at one end of the extraposition section and wraps around the outer circumference of a wire skin of the plurality of strands of core wires.

Further, after the second injection molding, a breathing channel from one end of the connection section away from the extraposition section to a surface of the extraposition section is formed in the joint, and the manufacturing method includes:

mounting a breathing film on the breathing channel close to the surface of the extraposition section.

Further, the manufacturing method includes:

interference fitting a pressing block in a port of the breathing channel being located on the surface of the extraposition section for pressing the breathing film, wherein at least one first through hole is formed on the pressing block.

Further, after the second injection molding process, a thread is formed around a circumference of the connection section, a cross-sectional dimension of the extraposition section is larger than a cross-sectional dimension of the connection section, and the manufacturing method includes:

providing a sealing ring around an outer circumference of the thread on one end of the connection section close to the extraposition section.

The embodiment of the present disclosure discloses a wire joint and a manufacturing method thereof. The wire joint includes a wire and a joint, the wire includes a plurality of strands of core wires and a first wire skin, the first wire skin of each strand of the core wires is stripped within a threshold interval and is subjected to a tin-impregnation treatment, an insulating wire fastener is provided between the each strand of the core wires, and the insulating wire fastener and the wire besides it are wrapped by the joint. The gaps between the plurality of strands of core wires and the gaps between a plurality of core wires of each strand of core wires are blocked, thereby avoiding the siphon phenomenon when the lamp is used, and improving the lighting effect and the safe use of the lamp.

BRIEF DESCRIPTION OF DRAWINGS

In order to describe the technical solutions in the embodiments of the present disclosure or the prior art more clearly, the drawings required to be used for descriptions about the embodiments or the prior art will be simply introduced below. It is apparent that the drawings described below are some embodiments of the present disclosure. Those of ordinary skill in the art may further obtain other drawings according to these drawings without creative work.

DESCRIPTION OF EMBODIMENTS

Implementations of the present disclosure will be described in detail below with reference to the accompanying drawings and embodiments, so that the implementation process of solving the technical problem by applying the technical means and achieving technical effect can be fully understood and implemented.

Certain terms used throughout the description and claims are used to refer to particular components. Those skilled in the art will understand that hardware manufacturers may call the same component by different nouns. The present description and claims do not use a name difference as a mode for distinguishing the components, but the functional difference of the components is taken as a criterion for distinguishing. The word "comprising" as used throughout the description and claims is an open term and should be interpreted as "comprising but not limited to". "Substantially" means that within an acceptable error range, those skilled in the art will be able to solve the technical problems within a certain error range, basically achieving the technical effects. In addition, the term "coupled" is used herein to include any direct and indirect electrical coupling means. Therefore, if it is described here that a first apparatus is coupled to a second apparatus, it is indicated that the first apparatus may be directly and electrically coupled to the second apparatus or indirectly and electrically coupled to the second apparatus through other apparatuses or coupling means. The description is described as an implementation mode for implementing the present disclosure. However, the description is intended to be illustrative of the general principle of the present disclosure, and is not intended to limit the scope of the present disclosure. The scope of protection of the present disclosure is subject to the definition of the appended claims.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

Specific Embodiments

Figure 1:
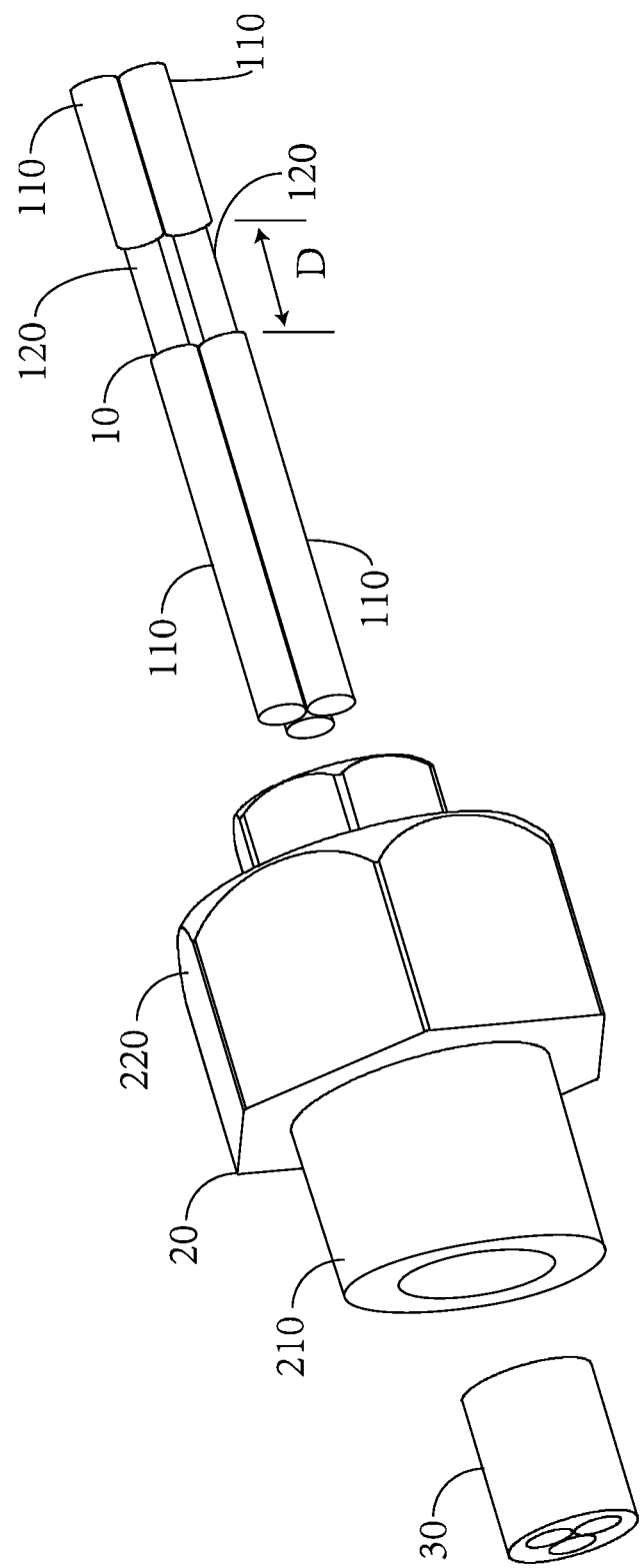
FIG. 1 is a schematic exploded view of a three-dimensional structure of a wire joint according to the present disclosure.

Please refer to FIG. 1, which is a schematic exploded view of a three-dimensional structure of a wire joint according to the present disclosure. The wire joint includes a wire 10, a joint 20 and an insulating wire fastener 30.

The wire 10 includes a first wire skin 110 and a plurality of strands of core wires 120. Each strand of the core wires 120 is respectively wrapped by the first wire skin 110, the first wire skin 110 outside the each strand of the core wires 120 is stripped within a threshold interval D, the each strand of the core wires 120 in the threshold interval D is subjected to tin-impregnation treatment, and the insulating wire fastener 30 is disposed between the each strand of the core wires 120 in the threshold interval D; the joint 20 includes a connection section 210 and an extraposition section 220, the insulating wire fastener 30 is wrapped in the extraposition section 220, and the connection section 210 is connected at one end of the extraposition section 220 and wraps around the outer circumference of the first wire skin 110 of the plurality of strands of core wires 120. In one preferred embodiment, the insulating wire fastener 30 is a PCB (Printed Circuit Board) brace or a PCB wire fastener.

Specifically, the wire 10 is a commonly used conductive wire of a lamp, and is generally consist of a plurality of strands of the core wires 120, commonly like two strands and three strands. For example, the two strands are respectively the live wire and the zero wire, and the three strands are respectively the live wire, the zero wire and the ground wire. The number of strands of the core wires 120 of the wire 10 described above is merely an example and does not constitute a limitation on the number of strands thereof. Each strand of the core wires 120 of the core wires is consist of a plurality of core wires, commonly like 7, 12, 19, 24, 27, 37, etc., the core wire herein includes but is not limited to a copper core wire. The outer circumference of each strand of the core wires 120 is wrapped by the first skin 110. The first skin 110 herein is made of an insulating material, so that the plurality of strands of the core wires 120 are insulated from each other when the plurality of strands of the core wires 120 are used being brought together. However, since the cross-section of each strand of the core wires 120 is generally circular, when the plurality of strands of the core wires 120 are brought together, gaps between the plurality of the strands of the core wires 120 are inevitable. At the same time, a plurality of core wires of the single-strand core wire 120 is not completely compact grouped, certain gaps are also existed between them. When one end of the wire 10 is connected to the power supply inside the lamp body and the other end is connected to the external power supply outside the lamp body, these gaps are bound to act as passages connecting the inside and outside the lamp body. After the lamp works for a long time, there is a temperature difference between the inside and the outside of the lamp body, that is, there is an atmospheric pressure difference between the inside and the outside of the lamp body. Since these gaps connect the inside and outside of the lamp body which may induce the siphon phenomenon between the inside and the outside of the lamp body, water vapor or even liquid water may enter the inside of the lamp body along these gaps, and then atomization will be formed inside the lamp, which will make bad effect on the lighting effect of the lamp, and even bring potential safety hazard to the use of lamp.

In view of the above technical problem, in the embodiment, each strand of the core wires 120 is stripped in the threshold interval D to remove the first wire skin 110 wrapped outside the core wire 120, thereby exposing a plurality of the core wires, and then the exposed plurality of the core wires of the plurality of the strands of the core wires 120 in the threshold interval D is subjected to tin-impregnation treatment, thereby blocking the gaps between the plurality of core wires. It should be noted that the plurality of core wires is applied with the flux before the tin-impregnation treatment, to ensure a better tin-impregnation quality of the plurality of core wires and improve the blocking effect of the gaps between the plurality of core wires. In the embodiment, after the tin-impregnation treatment, the insulating wire fastener 30 is disposed between the each strand of the core wires 120 in the threshold interval D to wrap the each strand of the core wires 120, and the gaps between the plurality of strands of the core wires 120 are filled to block the gaps between the plurality of strands of the core wires 120, where the insulating wire fastener 30 may be formed by injection molding. In addition, in the embodiment, the joint 20 is provided outside the wire 10. The specific manufacturing method herein includes but is not limited to integral injection molding, such that the extraposition section 220 is wrapped around the outer circumference of the insulating wire fastener 30, and the connection section 210 is connected to one end of the extraposition section 220 while being wrapped around the outer circumference of the first wire skin of the plurality of strands of the core wires 120. The connection section 210 herein is connected in the threading hole of the lamp body and the extraposition section 220 is outside the lamp body, two ends of the plurality of strands of the core wires 120 are passed through the connection section 210 and the extraposition section 220 respectively, one end is connected to the power source in the lamp body, and the other end is connected to an external power source outside the lamp body to complete the circuit connection of the lamp body.

In this embodiment, through the exposed plurality of the core wires of the plurality of strands of the core wires in the threshold interval D being subjected to the tin-impregnation treatment to block the gaps between the plurality of the core wires, and through the insulating wire fastener 30 being provided between the each strand of the core wires 120 in the threshold interval D to block the gaps between the plurality of the strands of core wires 120, the channel communicating the inside and outside of the lamp body is blocked, which may avoid the siphon phenomenon introduced by the atmospheric pressure difference between the inside and the outside of the lamp body when the lamp works for a long time and may prevent the atomization being formed inside the lamp when water vapor or even liquid water enters the inside of the lamp body along these gaps. Thereby, the lighting effect and the safe use of the lamp are improved.

Figure 2:
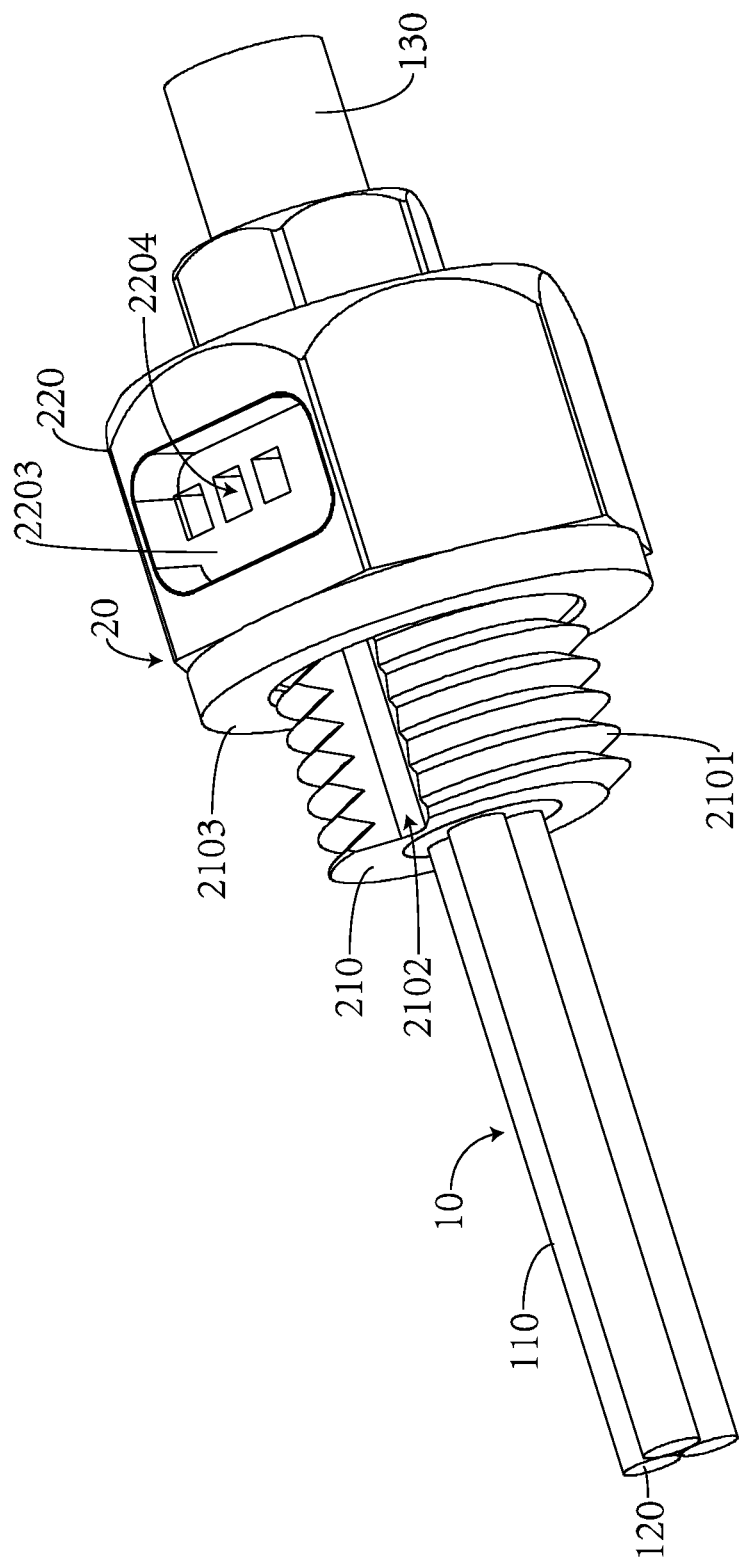
FIG. 2 is a schematic view of a three-dimensional structure of a wire joint according to the present disclosure.
Figure 3:
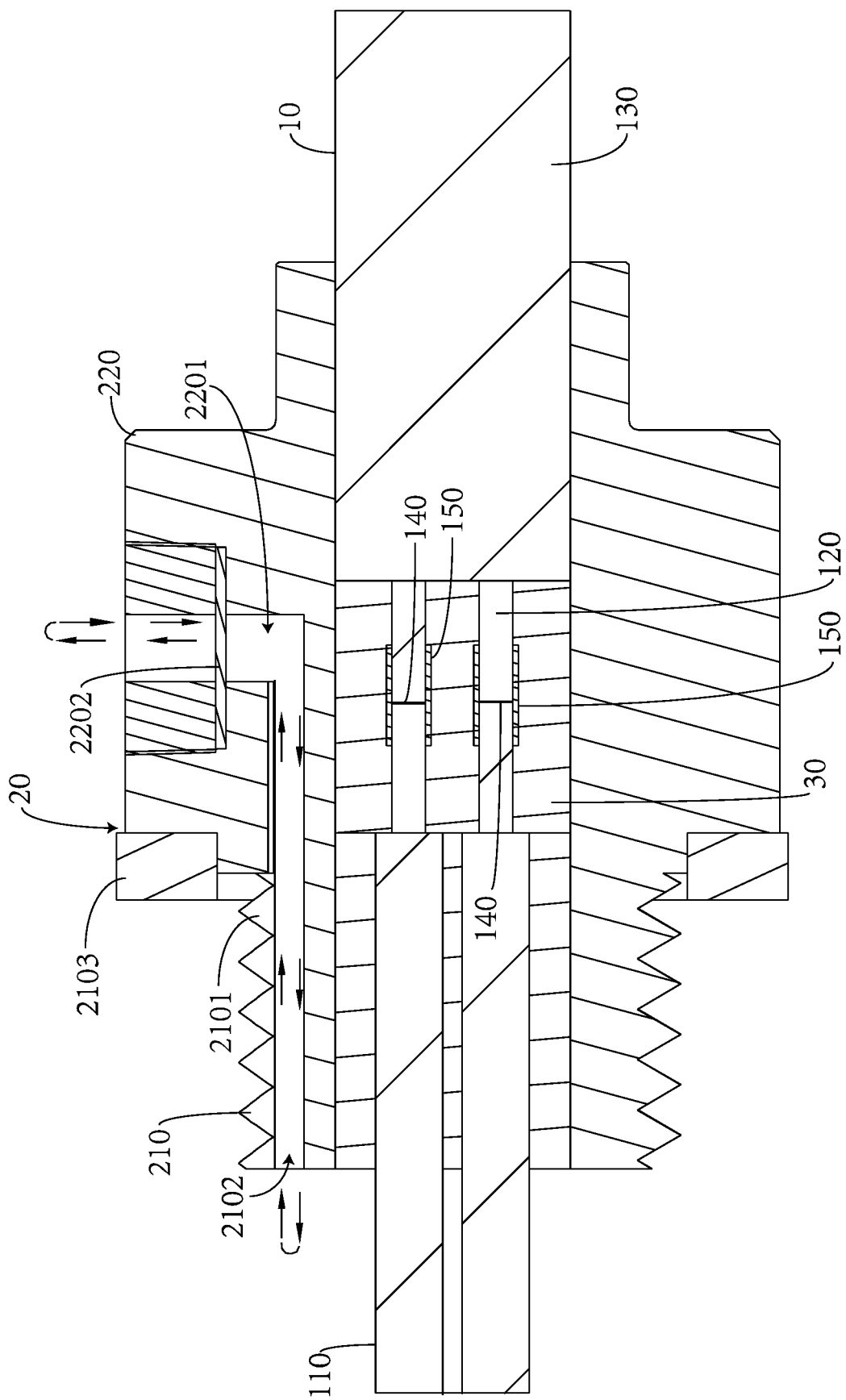
FIG. 3 is a schematic view of a cross-sectional structural of a wire joint according to the present disclosure.
Figure 5:
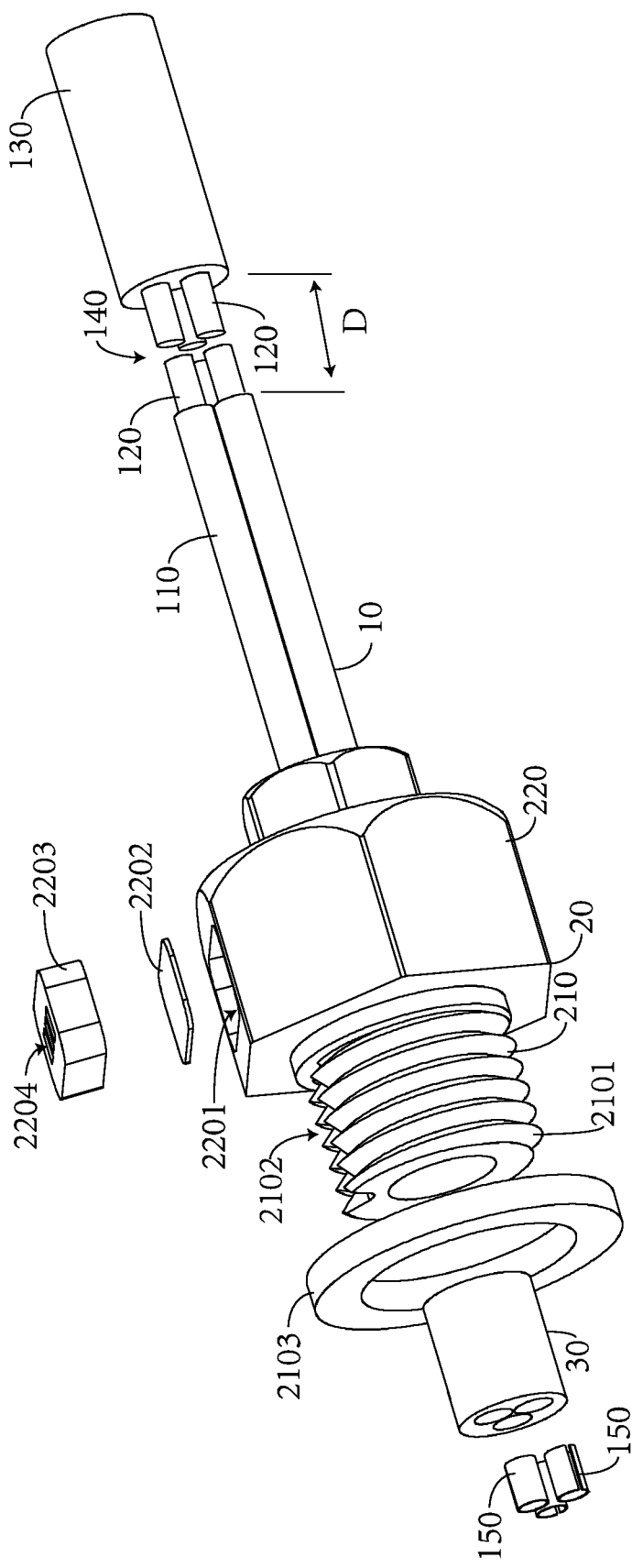
FIG. 5 is a schematic exploded view of another three-dimensional structure of the wire joint according to the present disclosure.

Please refer to FIG. 2, FIG. 3 and FIG. 5, in other preferred embodiments of the present disclosure, the cross-sectional dimension of the extraposition section 220 is larger than the cross-sectional dimension of the connection section 210, and the circumference of the connection section 210 is provided with a thread 2101, and a notch 2102 is formed on the thread 2101 along the length direction of the connection section 210. A first breathing channel 2201 is provided in the extraposition section 220, one port of the first breathing channel 2201 is in communication with the notch 2102, and the other port is located on a surface of the extraposition section 220, and a first breathing film 2202 is provided in the first breathing channel 2201.

Specifically, the circumference of the connection section 210 is provided with the thread 2101. In use, the lamp body of the lamp is also provided with a thread matched with the thread 2101 to complete the screw connection between the joint 20 and the lamp body. Here, the thread 2101 is not complete, and the notch 2102 is formed on the thread 2101 along the length direction of the connection section 210 to form a venting channel between the outside of the connection section 210 and the lamp body when the connection section 210 is screwed in the lamp body through the thread 2101. It should be noted here that the venting channel is not directly connected to the outside atmosphere. The first breathing channel 2201 is disposed in the extraposition section 220, and one port of the first breathing channel 2201 communicates with the notch 2102, that is, the venting channel communicates with the first breathing channel 2201, another port of the first breathing channel 2201 is located on the surface of the extraposition section 220, and the first breathing film 2202 is disposed in the first breathing channel 2201. The first breathing film 2202 herein possesses the property that air may pass through but liquid water may not pass through. The first breathing film 2202 is disposed in the first breathing channel 2201 communicating the inside and outside of the lamp body, such that a loop in the venting channel and the first breathing channel 2201 is formed for the air inside and outside the lamp body, as shown by the direction of the arrow in the figure, to ensure an atmospheric pressure balance between the inside and outside the lamp body, which may further avoid the siphon phenomenon, improve the lighting effect and the safe use of the lamp.

In addition, in this embodiment, since the thread 2101 is not complete, the notch 2102 leads to the forming of the venting channel when the joint 20 is connected to the lamp body. To prevent water stain outside the lamp body from entering the inside of the lamp body along the venting channel, the cross-sectional dimension of the extraposition section 220 is designed to be larger than the cross-sectional dimension of the connection section 210, such that when the connection section 210 is connected to the lamp body, the extraposition section 220 is close to the end portion of the connection section 210 and may abut against the surface of the lamp body to provide a waterproof effect.

Furthermore, to further improve the sealing property at the interface when the joint 20 is connected to the lamp body, a sealing ring 2103 is provided around an outer circumference of the thread 2101 on one end of the connection section 220 close to the extraposition section 210. The sealing ring 2103 herein includes but is not limited to being made of a soft material, such as silica gel or the like.

In addition, a first pressing block 2203 is interference fitted in the port of the first breathing channel 2201 being located on the surface of the extraposition section 220 for pressing the first breathing film 2202, and at least one first through hole 2204 is formed on the first pressing block 2203. Specifically, the first breathing film 2202 is disposed in the first breathing channel 2201 close to the port on the surface of the extraposition section 220, and the first breathing film 2202 is pressed relying on the first pressing block 2203 disposed on one side of the port on the surface of the extraposition section 220. The interference fit between the first pressing block 2203 and the first breathing channel 2201 may prevent the first pressing block 2203 from being out of the first breathing channel 2201 and improve the stability of the first breathing film 2202. Herein, at least one first through hole 2204 is disposed on the first pressing block 2203 for airflow in and out.

Figure 4:
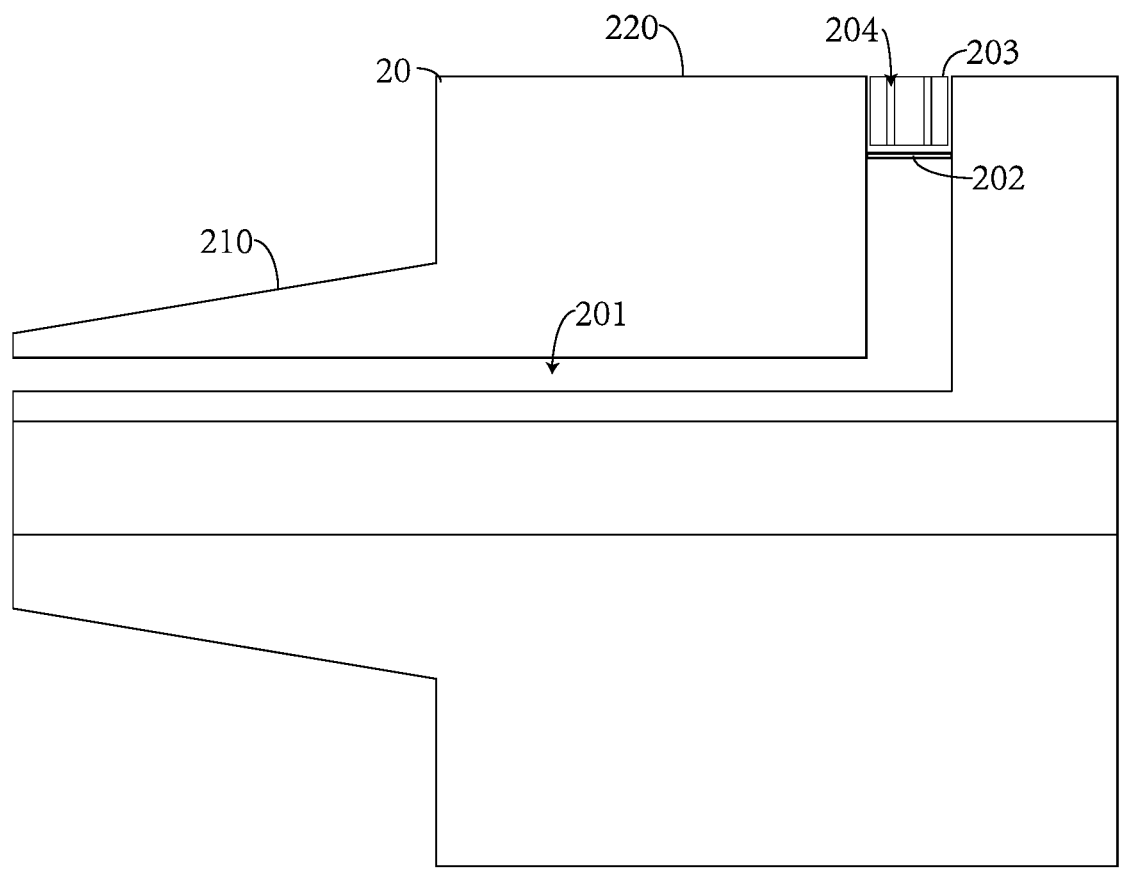
FIG. 4 is a schematic view of a cross-sectional structural of a joint of a wire joint according to the present disclosure.

Please refer to FIG. 4, in other preferred embodiments of the present disclosure, the cross-sectional dimension of the connection section 210 increases gradually from one end away from the extraposition section 220 to one end close to the extraposition section 220. A second breathing channel 201 is provided in the joint 20, one port of the second breathing channel 201 is located at the end of the connection section 210 away from the extraposition section 220, the other port is located on the surface of the extraposition section 220, and a second breathing film 202 is provided in the second breathing channel 201.

Specifically, the cross-sectional dimension of the connection section 210 gradually increases along the length direction of the connection section 210 from the end away from the extraposition section 220 to the end close to the extraposition section 220. When in use, the connection section 210 is plugged into the wiring hole on the lamp body to realize the connection between the joint 20 and the lamp body. Since the connection section 210 is similar in conical shape, the sealing property at the interface when the joint 20 is connected to the lamp body is ensured. At the same time, the second breathing channel 201 is disposed in the joint 20. It should be noted that the wire 10 and the insulating wire fastener 30 respectively have a distance from the second breathing channel 201 for safety, to ensure that the wire 10 and the insulating wire fastener 30 are wrapped by the injection molding material of the joint 20. One port of the second breathing channel 201 is located at the end of the connection section 210 away from the extraposition section 220, that is, is located inside the lamp body when the joint 20 and the lamp body are connected, and the other port of the second breathing channel 201 is located on the surface of the extraposition section 220, that is, is located outside the lamp body when the joint 20 and the lamp body are connected. The second breathing film 202 is disposed in the second breathing channel 201. Similar to the first breathing film 2202 in above embodiment, the second breathing film 202 herein possesses the property that air may pass through but liquid water may not pass through. That is, the second breathing film 202 is disposed in the second breathing channel 201 communicating the inside and outside of the lamp body, such that a loop in the second breathing channel 201 is formed for the air inside and outside the lamp body, to ensure an atmospheric pressure balance between the inside and outside the lamp body, which may further avoid the siphon phenomenon, improve the lighting effect and the safe use of the lamp.

In addition, a second pressing block 203 is interference fitted in the port of the second breathing channel 201 being located on the surface of the extraposition section 220 for pressing the second breathing film 202, and at least one second through hole 204 is formed on the second pressing block 203. The shape structure, the connection arrangement manner and the technical effect of the second breathing film 202, the second pressing block 203 and the second through hole 204 are respectively in consistent with the shape structure, the connection arrangement manner and the technical effect of the first breathing film 2022, the first pressing block 2203 and first through hole 2204 in above embodiment. Please refer to the detailed description of the above embodiment, and no further details are repeated herein.

Please refer to FIG. 2, FIG. 3, and FIG. 5, in other preferred embodiments of the present disclosure, the wire 10 further includes a second wire skin 130, and the second wire skin 130 wraps around the outer circumference of the first wire skin 110 of the plurality of strands of the core wires 120 outside the threshold interval D, and is wrapped by the joint 20.

Specifically, the existing conductive wire generally has two layers of insulated wire skins. One layer of the insulated wire skin is the first wire sheath 110, which wraps around the outer circumference of each strand of the core wires 120 to serve as insulation between the plurality of strands of the core wires 120. Another layer of the insulated wire skin is the second wire skin 130, which wraps the first wire skin of the plurality of strands of the core wires 120 outside the threshold interval D. The second wire skin 130 herein may wrap around one side of the outer circumference of the first wire skin 110 of the plurality of strands of the core wires 120 outside the threshold interval D, and may wrap around both sides of the outer circumference of the first wire skin 110 of the plurality of strands of the core wires 120 outside the threshold interval D, and the outer circumference of the second wire skin 130 is wrapped by the joint 20. The outer circumference of the second wire skin 130 herein may be wrapped only by the extraposition section 220, or may be wrapped only by the connection section 210, or may be wrapped by both the connection section 210 and the extraposition section 220. By the arrangement of the second wire skin 130, the tensile resistance of the wire 10 is enhanced, and the tensile strength of the joint 20 is improved. At the same time, the workload of the stripping process of the finished conductive wire is reduced, and the working efficiency is improved thereby.

Further, an interface 140 is provided at the each strand of the core wires 120 within the threshold interval D, the outer circumference of each interface 140 is wrapped by a copper terminal 150, and the outer circumference of each copper terminal 150 is wrapped by the insulating wire fastener 30.

Since the process of annular stripping of the insulated wire skins of the existing conductive wire is complicated, to simplify the manufacturing process, the stripping process may be conducted at the end of the two conductive wires respectively, after the tin-impregnation treatment the connection is conducted to form the interface 140. To improve the reliability of the connection at the interface 140, the outer circumference of the interface 140 is wrapped with the copper terminal 150. The copper terminal 150 is pressed against the two sides of the core wire 120 of the interface 140 and the insulating wire fastener 30 is injection molded on the outer circumference of the copper terminal 150 to form an insulation layer between the core wires, and then the joint 20 is injection molded on the outer circumference of the insulating wire fastener 30. In this embodiment, the interface 140 is formed by connecting the end of the two conductive wires to the interface 140 after the stripping process, wasting material is avoided when the length of the conductive wire is inappropriate (too long or too short) thereby. In particular, in the case where the length of the conductive wire required in the lamp body is relatively fixed, this connection method may satisfy the installation requirement of the lamp, and may effectively improve the utilization rate of the material.

Figure 6:
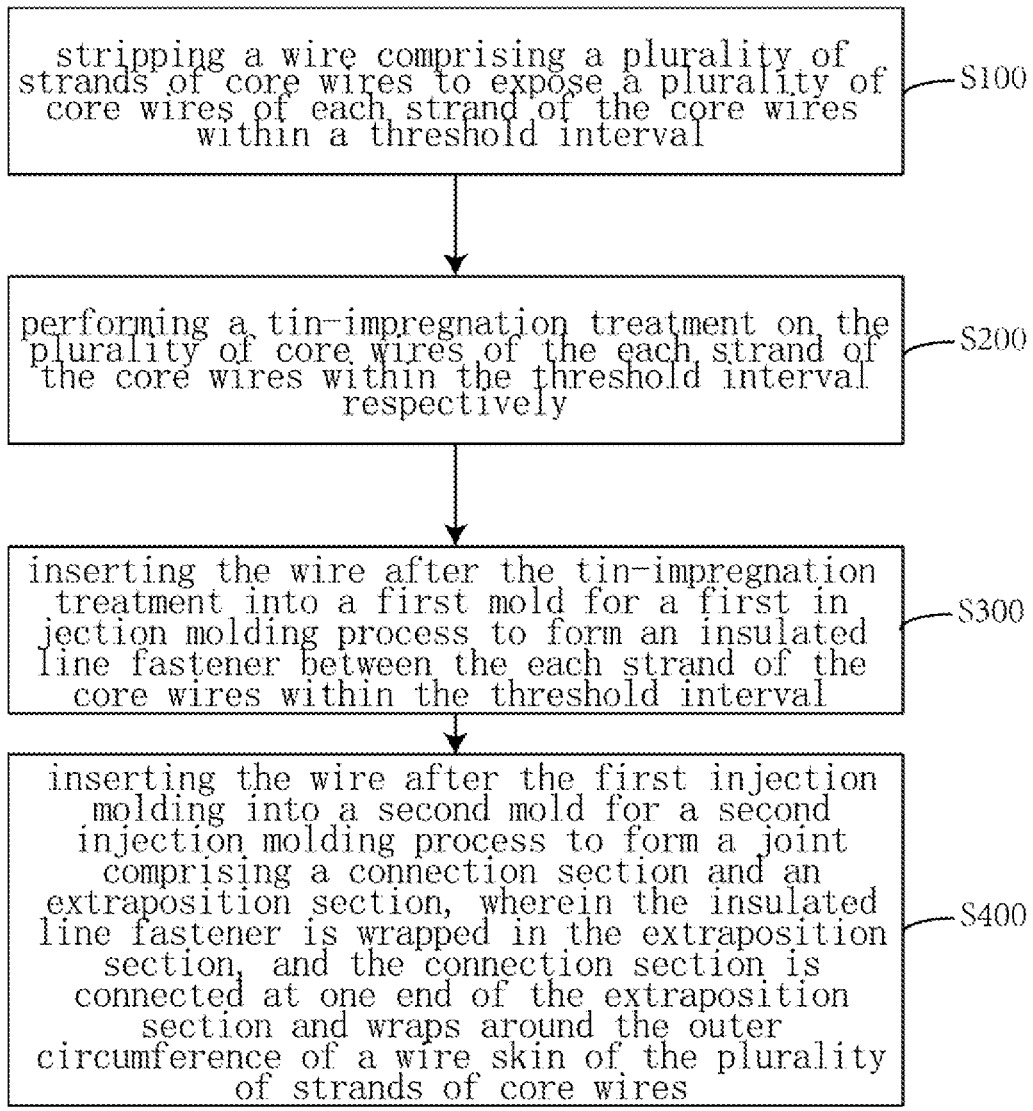
FIG. 6 is a flow chart of a manufacturing method of a wire joint according to the present disclosure.

Please refer to FIG. 6, which is a flow chart of a manufacturing method of a wire joint according to the present disclosure. The manufacturing method of the wire joint includes:

Step S100, stripping a wire comprising a plurality of strands of core wires to expose a plurality of core wires of each strand of the core wires within a threshold interval;

Step S200, performing a tin-impregnation treatment on the plurality of core wires of the each strand of the core wires within the threshold interval respectively;

Step S300, inserting the wire after the tin-impregnation treatment into a first mold for a first injection molding process to form an insulating wire fastener between the each strand of the core wires within the threshold interval; and Step S400, inserting the wire after the first injection molding into a second mold for a second injection molding process to form a joint comprising a connection section and an extraposition section, wherein the insulating wire fastener is wrapped in the extraposition section, and the connection section is connected at one end of the extraposition section and wraps around the outer circumference of a wire skin of the plurality of strands of core wires.

In the step S100, the finished wire is subjected to a stripping process. The wire includes a plurality of strands of the core wires, and each strand of the core wires includes a plurality of core wires. The wire specifically includes an outer skin wrapped around the outer circumference of the plurality of strands of the core wires, an inner skin wrapped around the outer circumference of the plurality of the core wires, and the plurality of the core wires. The wire is subjected to an annular stripping process herein to expose a plurality of core wires of each strand of the core wires within a threshold interval of the plurality of strands of the core wires. The inner skin outside the plurality of core wires and the outer skin within the threshold interval need to be completely stripped off, the inner skin on both sides of the threshold interval need not be stripped off, and the outer skin on both sides of the threshold interval may be selectively stripped off. The outer skin on both sides of the threshold interval herein is kept to improve the tensile strength of the wire and improve the quality of the wire joint.

Taking the above step, in the step S200, after the exposed plurality of core wires are obtained, the plurality of strands of the core wires of each strand of the core wires within the threshold interval are respectively subjected to tin-impregnation treatment. The specific method includes but is not limited to invading the each strand of the core wires into the flux, and then invading into the tin liquid, such that the outer circumference of each core wire of the each strand of the core wires of the is wrapped with tin particles.

In the above embodiment, one single finished wire is subjected to an annular stripping treatment, and then the tin-impregnation treatment. In other preferred embodiments of the present disclosure, two finished wires may be subjected to the stripping treatment respectively, to expose plurality of core wires of each strand of the core wires at the ends. And then the exposed plurality of core wires of each strand of the core wires at the two ends are subjected to tin-impregnation treatment. After so a copper terminal is used to butt and press the exposed plurality of core wires of each strand of the core wires at the two ends, thereby completing the connection of two finished wires. The stripping treatment and tin-impregnation treatment are also completed at the interface of the two wires. This method may effectively utilize the wires of different lengths, improve the utilization rate of materials, and reduce the workload of the annular stripping of the entire finished wire, thereby improving the work efficiency.

Taking the above steps, in step S300, the wire after the tin-impregnation treatment is placed in the first mold for the first injection molding process. The purpose of the present injection molding is to form an insulating wire fastener between each strand of the core wires within the threshold interval. The insulating wire fastener herein is made by injection molding and wraps around the outer circumference of each strand of the core wire after the tin-impregnation treatment, or wraps around the outer circumference of the copper terminal outside each strand of the core wires, to form an insulation layer between the plurality of strands of core wires of the wire.

Taking above steps, in the step S400, the wire after the first injection molding process is placed in a second mold to perform the second injection molding process, to form a joint around the outer circumference of the wire. The joint includes the connection section and the extraposition section connected to each other. The extraposition section wraps the insulating wire fastener therein, and the connection section is connected to one end of the extraposition section and wraps around the outer circumference of the wire skin of the plurality of strands of the core wires. When in use, the connection section is connected in a wiring hole on the lamp body of the lamp, the extraposition section is disposed outside the lamp body, and the wire is electrically connected to the power source inside the lamp body and the power source outside the lamp body passing through the connector.

In the present embodiment, a plurality of exposed core wires of each strand of the core wire within the threshold interval are subjected to a tin-impregnation treatment, to block the gaps between a plurality of the core wires. And the insulating wire fastener is provided between each strand of the core wires within the threshold interval by injection molding, to block the gaps between a plurality of strands of the core wires. The channel communicating the inside and outside of the lamp body is blocked, which may avoid the siphon phenomenon introduced by the atmospheric pressure difference between the inside and the outside of the lamp body when the lamp is in work and may prevent the atomization being formed inside the lamp when water vapor or even liquid water enters the inside of the lamp body along these gaps. Thereby, the lighting effect and the safe use of the lamp are improved.

Figure 7:
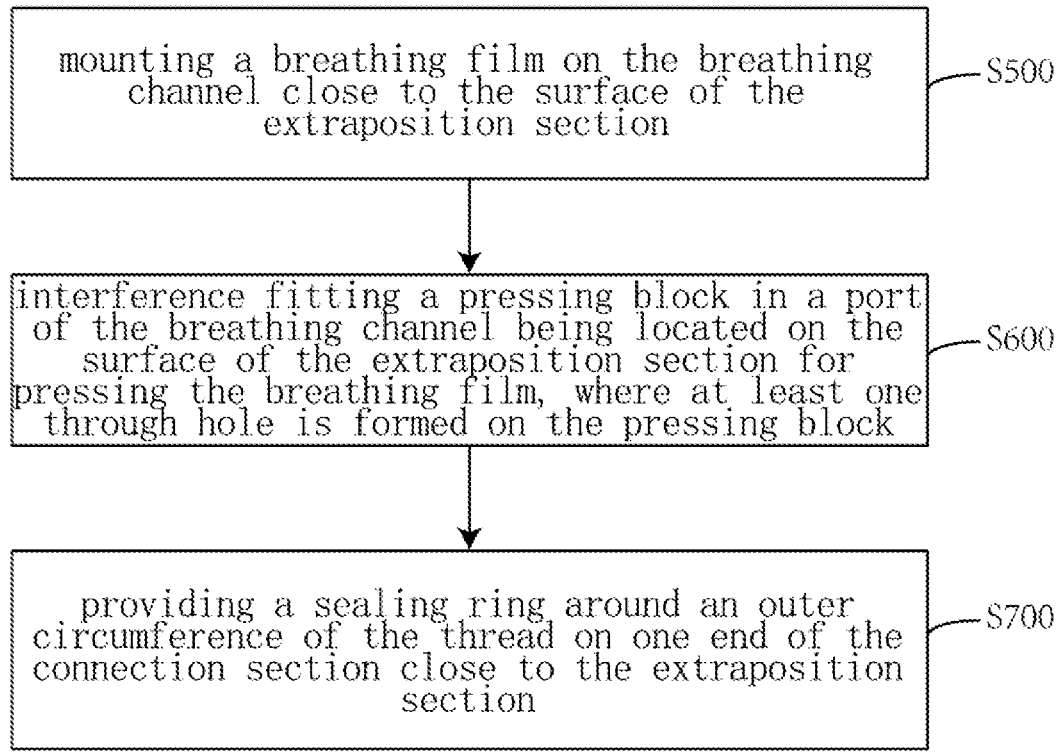
FIG. 7 is a flow chart of a manufacturing method of a wire joint according to the present disclosure.

Please refer to FIG. 7, which is a flow chart of a manufacturing method of a wire joint according to the present disclosure. The present embodiment is based on the above embodiment, and the manufacturing method of the wire joint further includes:

Step S500, mounting a breathing film on the breathing channel close to the surface of the extraposition section;

Step S600, interference fitting a pressing block in a port of the breathing channel being located on the surface of the extraposition section for pressing the breathing film, where at least one through hole is formed on the pressing block;

Step S700, providing a sealing ring around an outer circumference of the thread on one end of the connection section close to the extraposition section.

Specifically, after the second injection molding process, a breathing channel is formed in the joint from the end of the connection section away from the extraposition section to the surface of the extraposition section. When in use, the joint is connected on the lamp body, a port of the breathing channel is located at an end of the connection section away from the extraposition section, that is, inside the lamp body, another port of the breathing channel is located at a surface of the extraposition section, that is, outside the lamp body, the inside and the outside of the lamp body are communicated by the breathing channel.

In step S500, a breathing film is mounted at a location of the breathing channel close to the surface of the extraposition section. The breathing film herein possesses the property that air may pass through but liquid water may not pass through, that is, the breathing film is disposed in the breathing channel communicating the inside and outside of the lamp body, such that a loop in the breathing channel is formed for the air inside and outside the lamp body, to ensure an atmospheric pressure balance between the inside and outside the lamp body, which may further avoid the siphon phenomenon, improve the lighting effect and the safe use of the lamp.

Further, in step S600, the pressing block is further provided in the breathing channel for pressing the breathing film, in particular, the pressing block is interference fitted in a port of the breathing channel being located on the surface of the extraposition section, where at least one through hole is formed on the pressing block. The through hole herein is available for airflow in and out of the breathing channel. The pressing block herein is interference fitted with the breathing channel to prevent the pressing block from being out of the breathing channel, to improve the stability of the breathing film.

In addition, after the second injection molding process, the cross-sectional dimension of the extraposition section of the formed joint is larger than the cross-sectional dimension of the connection section, that is, the joint has one smaller end and one bigger end, and the smaller end is used for connecting the wiring hole on the lamp body. The specific connection method includes but is not limited to a threaded connection, that is, a thread is formed on the outer circumference of the connection section, and a thread matching the above described thread is provided in the wiring hole on the lamp body to complete connection. In step S700, a sealing ring is provided around an outer circumference of the thread on one end of the connection section close to the extraposition section. The arrangement of the sealing ring may improve the sealing property at the interface when the joint is connected with the lamp body. In addition, the breathing channel mentioned in the above embodiments is formed inside the joint during the injection molding. But in other preferred embodiments, one section thereof may be formed in the extraposition section of the joint, the other section thereof is a notch formed on the thread on the connection section, and the notch is opened along the length of the connection section and communicates with the breathing channel in the extraposition section. When the joint is connected to the lamp body, the notch is formed along a length direction of the connection section and communicates with the section in the extraposition section. When the joint is in connection with the lamp body, the notch and the inner wall of the wiring hole of the lamp body form a channel which communicates with the breathing channel in the extraposition section to communicate the inside and outside of the lamp body. And by the breathing film disposed in the breathing channel, such that a loop in the breathing channel is formed for the air inside and outside the lamp body, to ensure an atmospheric pressure balance between the inside and outside the lamp body, which may further avoid the siphon phenomenon, improve the lighting effect and the safe use of the lamp.

It should be noted that, in the case that the structures do not conflict, the structures of each part mentioned in the above embodiments may be combined with each other. To avoid repetition, the technical solutions obtained after the combination are not described herein again, but are the technical solutions obtained after combination should also fall within the scope of protection of the present disclosure.

It is finally to be noted that the above embodiments are adopted not to limit but only to describe the technical solutions of the present disclosure. Although the present disclosure has been described with reference to the above-mentioned embodiments in detail, those of ordinary skill in the art should know that modifications may still be made to the technical solutions recorded in each embodiment or equivalent replacements may be made to part of technical features therein. These modifications or replacements do not make the essences of the corresponding technical solutions depart from the spirit and scope of the technical solutions of each embodiment of the present disclosure.

What is claimed is:

1. A wire joint comprising:
  a wire and a joint;
  wherein the wire comprises a plurality of strands of conductive core wires and a plurality of first insulating wire skins, each strand of the plurality of strands of the conductive core wires is wrapped by an individual first insulating wire skin of the first insulating wire skins,
  the plurality of the first insulating wire skins on the each strand of the plurality of strands of the conductive core wires are continuous along a first end of the joint to a second end of the joint opposite to the first end of the joint along a length of joint except at a threshold interval wherein the first insulating wire skins are stripped,
  the each strand of the conductive core wires in the threshold interval is subjected to a tin- impregnation treatment, and an insulating wire fastener is provided between the each strand of the conductive core wires in the threshold interval;
  the joint comprises a connection section and an extraposition section, the insulating wire fastener is wrapped in the extraposition section, and the connection section is connected at one end of the extraposition section and wraps around the outer circumference of the first insulating wire skins of the plurality of strands of the conductive core wires;
  the plurality of strands of conductive core wires are continuous along the first end of the joint to the second end of the joint opposite to the first end along the length of the joint,
  wherein an outer circumference of the connection section is provided with a thread, and a notch is formed on the outer circumference of the connection section passing through the thread along a length of the connection section,
  wherein a cross-sectional dimension of the extraposition section is larger than a cross-sectional dimension of the connection section, a first breathing channel is provided in the extraposition section, one port of the first breathing channel is directly connected with the notch, and other port of the first breathing channel is located on an outer circumference of the extraposition section, and a first breathing film is provided in the first breathing channel.

2. The wire joint according to claim 1, wherein a first pressing block is interference fitted in the other port of the first breathing channel being located on the outer circumference of the extraposition section for pressing the first breathing film, and at least one first through hole is formed on the first pressing block.

3. The wire joint according to claim 1, wherein a sealing ring is provided around an outer circumference of the thread on one end of the connection section close to the extraposition section.

4. The wire joint according to claim 1, wherein the cross-sectional dimension of the connection section increases gradually from one end of the connection section away from the extraposition section to other end of the connection section close to the extraposition section;

a second breathing channel is provided in the joint, one port of the second breathing channel is located at the end of the connection section away from the extraposition section, other port of the second breathing channel is located on the outer circumference of the extraposition section, and a second breathing film is provided in the second breathing channel.

5. The wire joint according to claim 4, wherein a second pressing block is interference fitted in the other port of the second breathing channel being located on the outer circumference of the extraposition section. for pressing the second breathing film, and at least one second through hole is formed on the second pressing block.

* * * * *